(12) United States Patent
Izuel Sanz

(10) Patent No.: US 10,398,157 B2
(45) Date of Patent: Sep. 3, 2019

(54) METHOD FOR PREPARING FROZEN FRIED EGGS

(71) Applicant: Francisco Javier Izuel Sanz, Vitoria-Gasteiz (ES)

(72) Inventor: Francisco Javier Izuel Sanz, Vitoria-Gasteiz (ES)

( * ) Notice: Subject to any disclaimer, the term of this patent is extended or adjusted under 35 U.S.C. 154(b) by 0 days.

(21) Appl. No.: 14/578,572

(22) Filed: Dec. 22, 2014

(65) Prior Publication Data

US 2015/0272193 A1    Oct. 1, 2015

(30) Foreign Application Priority Data

Mar. 28, 2014   (ES) .................................. 201430457

(51) Int. Cl.
| | | |
|---|---|---|
| *A23L 5/10* | (2016.01) | |
| *A23B 5/04* | (2006.01) | |
| *A23L 15/00* | (2016.01) | |
| *A23P 30/10* | (2016.01) | |

(52) U.S. Cl.
CPC .................. *A23L 5/15* (2016.08); *A23B 5/041* (2013.01); *A23L 5/12* (2016.08); *A23L 15/00* (2016.08); *A23P 30/10* (2016.08); *A23V 2002/00* (2013.01)

(58) Field of Classification Search
CPC ......... A23V 2002/00; A23L 1/32; A23L 3/44; A23L 5/15; A23L 5/12; A23L 15/00; A23P 1/10; A23P 30/10; A23B 5/041
See application file for complete search history.

(56) References Cited

U.S. PATENT DOCUMENTS

| | | | | |
|---|---|---|---|---|
| 2,902,396 | A | 9/1959 | Reynolds | |
| 4,409,249 | A | 10/1983 | Forkner | |
| 5,620,735 | A * | 4/1997 | Manderfeld et al. | 426/614 |
| 7,939,123 | B2 | 5/2011 | Tillis | |
| 2002/0058098 | A1 * | 5/2002 | Knipper | A23L 15/00 426/614 |
| 2003/0118714 | A1 | 6/2003 | Merkle et al. | |
| 2005/0136172 | A1 | 6/2005 | Hairsine et al. | |
| 2007/0087106 | A1 | 4/2007 | Tillis | |

FOREIGN PATENT DOCUMENTS

| | | |
|---|---|---|
| JP | 07-135944 | 5/1995 |
| WO | 03/001924 | 1/2003 |

OTHER PUBLICATIONS

Semiliquid defiintion, https://www.merriam-webster.com/dictionary/semiliquid, retrievied online Mar. 25, 2019 (Year: 2019).*
Vaclavik, Vickie A. and Elizabeth W. Christian, Essentials of Food Science, third edition, Springer, Dec. 2007, pp. 219 (Year: 2007).*
Strawbridge, Dick and James Strawbridge, Made at Home: Eggs & Poultry: Grow, Harvest, Preserve, Cook and Make the Most of Your Local Produce, Octopus Publishing Group Limited, 2012. (Year: 2012).*
Rosenthal, Amauri, Rosires Deliza, Jorge Welti-Chanes, Gustavo V. Basrosa-Canovas, Fruit Preservation: Novel and Conventional Technologies, Springer, Mar. 1, 2018 (Year: 2018).*
Owen J. Cotterill et al., "Freezing Egg Products", Egg Science and Technology, Westport, Avi Publ, US, pp. 143-149, (Jan. 1, 1973), XP002071961.
Jane S.R. Coimbra et al., "Density, heat capacity and thermal conductivity of liquid egg products", Journal of Food Engineering, Barking, Essex, GB, vol. 74, No. 2, ISSN 0260-8774, (May 1, 2006), pp. 186-190, (XP027891032).
International Search Report dated Dec. 16, 2014 in International (PCT) Application No. PCT/ES2014/070820.
Frozen pre-cooked fried egg for the industry. In: Frozen food Europe. Mar. 21, 2013 [on line] Retrieved from Internet [retrieved on Apr. 21, 2014] http://www.frozenfoodeurope.com/article/products/frozen-pre-cooked fried-egg-industry.

* cited by examiner

*Primary Examiner* — Hong T Yoo

(74) *Attorney, Agent, or Firm* — Wenderoth, Lind & Ponack, L.L.P.

(57) ABSTRACT

A method for preparing frozen fried eggs from fresh eggs, in which the fresh eggs are broken into corresponding molds impregnated with oi, introduced into a convection oven at a temperature of 232 to 252° C. for a period of 130 to 150 seconds to be fried, and subsequently introduced into a blast chiller at a temperature of −23 to −13° C. for a period of 15 to 25 minutes to be frozen, and ultimately packaged in a unitary manner so that, when defrosted, each fried egg has a similar texture to that of a recently made fried egg.

4 Claims, 1 Drawing Sheet

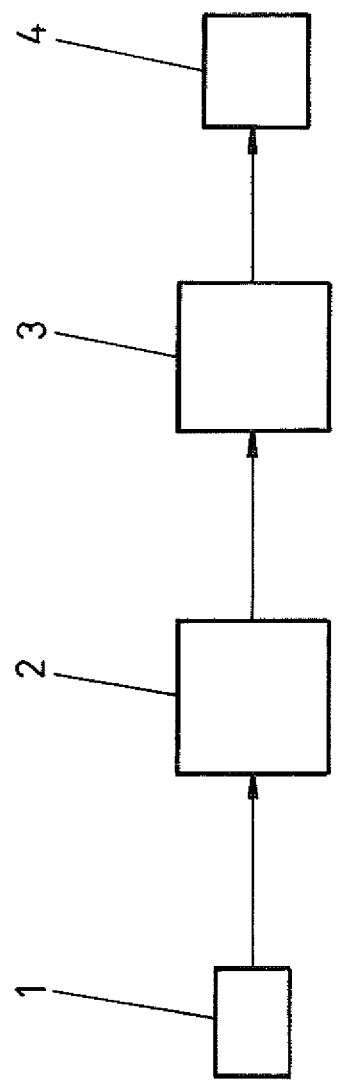

METHOD FOR PREPARING FROZEN FRIED EGGS

BACKGROUND OF THE INVENTION

1. Field of the Invention

In the present specification, a method for preparing frozen fried eggs is described, with application in the foodstuffs industry, the method being able to be commercialized both at an industrial level, for example, for bars and restaurants, and at a domestic level.

2. Description of Related Art

Traditionally, the consumption of fried eggs takes place at the same time as the eggs are fried, attempting to obtain a fried egg which retains the yolk in liquid form (such as a gel texture) with the ends of the egg white remaining curdled and even slightly burnt to obtain so-called frills.

On the other hand, faced with the difficulty of industrially commercializing frozen fried eggs, it has been attempted to commercialize simulated egg products and thus, in patent document, ES-2180741, a method for producing unitary portions of simulated egg and/or simulated egg yolks is described based on: putting together a predetermined quantity of egg yolk; freezing the egg yolk in form at a temperature of −34° C. or less for at least 15 minutes to provide an egg yolk in a form such that the egg yolk is like a gel and is self-sustaining and retains its form when defrosted; combining the egg yolk in form with a predetermined quantity of egg white and cooking the combined egg yolk and egg white to obtained a unitary portion of simulated egg At the same time, in ES-2180741, reference is made to other documents such as U.S. Pat. Nos. 3,863,018; 3,941,892 and 4,409,249 in which different methods for producing a simulated egg product are described, such that in U.S. Pat. No. 3,863,018, a solid frozen nucleus or rod of cooked egg yolk suspended in liquid egg whites in an elongated pack is used, in U.S. Pat. No. 3,941,892, a synthetic yolk is used which contains dry egg white, oil, milk proteins, gum, colors, flavors, emulsions and water and in U.S. Pat. No. 4,409,249, the method proceeds from a dispersion of homogeneous aired egg white and egg yolk processed such that the egg whites and yolk are treated separately and are later combined.

Similarly, in ES-2180741, reference is made to other documents such as U.S. Pat. Nos. 5,073,399; 5,149,561; 5,151,293 and 5,227,189 in which a simulated egg is provided having separate portions of egg yolk and egg white and the egg yolk is a synthetic material which contains an edible liquid, a colorant and a thermoreversible gel former.

OBJECT OF THE INVENTION

The following invention, as outlined in the introduction of the current specification, relates to a method for preparing frozen fried eggs, the object being that once a frozen fried egg has been defrosted, a fried egg is obtained having a number of the same organoleptic characteristics as a recently made fried egg such as the same texture, smell, color and taste.

Thus, the possibility of having frozen fried eggs, which, when defrosted, have identical characteristics as recently made fried eggs has the primary advantage for health since, in the process of the preparation of the frozen fried eggs, the possible presence of disease transmitting bacteria is eliminated.

At the same time, in addition, since it is possible to have frozen fried eggs, the operation of making the fried eggs is avoided, which, as is known, requires the use of tools which are stained and the generation, normally, of smoke which also produces soiling. Given that the operation of defrosting the frozen fried eggs, both at an industrial level and a domestic level, is carried out with total cleanliness and simplicity, the fried eggs can be consumed without creating any soiling.

BRIEF DESCRIPTION OF THE DRAWINGS

FIG. 1 shows a view of a schematic diagram of the process followed for preparing frozen fried eggs.

DETAILED DESCRIPTION OF THE INVENTION

In the present specification, a method for preparing frozen fried eggs is described such that, proceeding from fresh eggs, the method comprises:
   breaking of eggs into corresponding molds impregnated with oil;
   introduction of the molds with the eggs into a convection oven at a temperature of 232 to 252° C. for a period of 130 to 150 seconds to be fried;
   introduction of the molds with the fried eggs into a blast chiller at a temperature of −23 to −13° C. for a period of 15 to 25 minutes to be frozen, and;
   unitary packing of the molds with the frozen fried eggs, such that when the frozen fried eggs are defrosted, each fried egg is obtained having a texture similar to that of a recently made fried egg, allowing fried eggs to be provided without requiring the fried eggs to be made at the time the eggs are consumed, an operation which involves time and which produces soiling when it is carried out, both by the tools used as well as in general by the generation of smoke which is usually produced.

In a preferred embodiment, the method for preparing frozen fried eggs is based on the fact that:
   The broken eggs in corresponding molds impregnated with oil are introduced into a convection oven at a temperature of 238 to 246° C. for a period of 136 to 144 seconds to be fried and subsequently;
   The molds with the fried eggs are introduced into a blast chiller at a temperature of −20 to −16° C. for a period of 18 to 22 minutes to be frozen, and ultimately packaged.

More preferably, the method for preparing frozen fried eggs is based on the fact that:
   The broken eggs in corresponding molds impregnated with oil are introduced into a convection oven at a temperature of 242° C. for a period of 140 seconds to be fried and subsequently;
   The molds with the fried eggs are introduced into a blast chiller at a temperature of −22° C. for a period of 20 minutes to be frozen, and ultimately packaged.

In order to complement the description and with the object of aiding a better understanding of the characteristics of the invention, the present specification is accompanied by a set of drawings, which figures, in an illustrative and non-limiting manner, represent the most characteristic details of the invention.

Description of a Preferred Embodiment

In view of the cited FIGURE and in accordance with the numeration adopted, it can be seen how to carry out the method which is the object of the invention, the method proceeding from fresh eggs which are broken into corresponding molds 1 impregnated with oil to be introduced into a convection oven 2 at a temperature of 232 to 252° C. for a period of 130 to 150 seconds to be fried and to be subsequently introduced into a blast chiller 3 at a temperature of −23 to −13° C. for a period of 15 to 25 minutes to be frozen, and ultimately packaging 4 of the molds with the frozen fried eggs takes place such that the eggs are packaged as a unit.

In a preferred embodiment, the method for preparing frozen fried eggs is based on the fact that the broken eggs in corresponding molds 1 impregnated with oil are introduced into a convection oven 2 at a temperature of 238 to 246° C. for a period of 136 to 144 seconds to be fried and are subsequently introduced into a blast chiller 3 at a temperature of −20 to −16° C. for a period of 18 to 22 minutes to be frozen, and ultimately packaging 4 of the molds with the frozen fried eggs takes place such that the eggs are packaged as a unit.

More preferably, the method for preparing frozen fried eggs is based on the fact that the broken eggs in corresponding molds 1 impregnated with oil are introduced into a convection oven 2 at a temperature of 242° C. for a period of 140 seconds to be fried and are subsequently introduced into a blast chiller 3 at a temperature of −22° C. for a period of 20 minutes to be frozen, and ultimately packaging 4 of the molds with the frozen fried eggs takes place such that the eggs are packaged as a unit.

In this way, fried eggs may be provided without requiring the same to be made, an operation which, as is known, requires the use of a series of tools which become soiled and, even worse is the fact that when frying the fried eggs, smoke is usually generated which causes soiling in the kitchen and the production of odors.

At the same time, the method has the advantage that, given that not all people have the same ability to make fried eggs, people who do not have this ability can consume fried eggs with no problem.

The invention claimed is:

1. A method for preparing frozen fried eggs from whole fresh eggs consisting of:
    breaking the whole fresh eggs into corresponding molds impregnated with oil;
    introducing the molds with the broken whole fresh eggs into a convection oven at a temperature of 232 to 252° C. for a period of 130 to 150 seconds so as to fry the broken whole fresh eggs in the oil;
    introducing the molds with the fried eggs into a blast chiller at a temperature of −23 to −13° C. for a period of 15 to 25 minutes so as to freeze the fried eggs;
    unitary packing the molds with the frozen fried eggs; and
    optionally, defrosting the frozen fried eggs to obtain defrosted fried eggs, wherein the defrosted fried eggs have a texture of a freshly prepared fried egg.

2. The method for preparing frozen fried eggs according to claim 1, wherein:
    the molds with the broken whole fresh eggs are introduced into the convection oven at the temperature of 238 to 246° C. for the period of 136 to 144 seconds so as to fry the broken whole fresh eggs in the oil and subsequently;
    the molds with the fried eggs are introduced into the blast chiller at the temperature of −20 to −16° C. for the period of 18 to 22 minutes so as to freeze the fried eggs.

3. The method for preparing frozen fried eggs according to claim 1, wherein:
    the molds with the broken whole fresh eggs are introduced into the convection oven at the temperature of 242° C. for the period of 140 seconds so as to fry the broken whole fresh eggs in the oil and subsequently;
    the molds with the fried eggs are introduced into the blast chiller at the temperature of −22° C. for the period of 20 minutes so as to freeze the fried eggs.

4. The method for preparing frozen fried eggs according to claim 1, wherein the method is capable of being performed at an industrial scale.

* * * * *